(12) United States Patent
Shin et al.

(10) Patent No.: US 11,349,118 B2
(45) Date of Patent: May 31, 2022

(54) TANGENT GRADIENT CONCENTRATION MATERIAL FOR BATTERY, DIGITAL GRADIENT CONCENTRATION MATERIAL FOR BATTERY

(71) Applicant: UCHICAGO ARGONNE, LLC, Chicago, IL (US)

(72) Inventors: YoungHo Shin, LaGrange Highlands, IL (US); Gregory K. Krumdick, Homer Glen, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 105 days.

(21) Appl. No.: 16/140,234

(22) Filed: Sep. 24, 2018

(65) Prior Publication Data

US 2020/0099045 A1    Mar. 26, 2020

(51) Int. Cl.

| | |
|---|---|
| *H01M 4/36* | (2006.01) |
| *H01M 4/505* | (2010.01) |
| *H01M 4/525* | (2010.01) |
| *H01M 10/0525* | (2010.01) |
| *H01M 4/04* | (2006.01) |
| *H01M 4/485* | (2010.01) |
| *H01M 4/02* | (2006.01) |

(52) U.S. Cl.
CPC ......... *H01M 4/366* (2013.01); *H01M 4/0471* (2013.01); *H01M 4/485* (2013.01); *H01M 4/505* (2013.01); *H01M 4/525* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | |
|---|---|---|
| 9,446,967 B2 | 9/2016 | Krumdick et al. |
| 2016/0049648 A1 | 2/2016 | Noh et al. |
| 2016/0049649 A1 | 2/2016 | Noh et al. |
| 2016/0049650 A1 | 2/2016 | Noh et al. |
| 2016/0156030 A1 | 6/2016 | Sun et al. |
| 2016/0190573 A1 | 6/2016 | Sun et al. |
| 2016/0218350 A1 | 7/2016 | Noh et al. |
| 2017/0222225 A1* | 8/2017 | Kang ............ H01M 4/1391 |
| 2018/0175387 A1* | 6/2018 | Kim .............. H01M 4/133 |

* cited by examiner

*Primary Examiner* — Carmen V Lyles-Irving
(74) *Attorney, Agent, or Firm* — Cherskov Flaynik & Gurda, LLC

(57) ABSTRACT

The invention provides a cathode active material having a discrete change in concentrations of a first base region and a second pulse region. Also provided is a method for preparing a cathode active material, the method having the steps: supplying chelating agent, aqueous basic solution and a first aqueous metal salt solution to a reactor to create a base region; supplying a second aqueous metal-salt solution to a reactor to form a pulse region, wherein the second aqueous metal-salt solution is intermittently or continuously added during or after the creation of the base region; thermally treating the base region and the pulse region to create active metal precursors; mixing the precursors with lithium salt to produce a mixture; and thermally treating the mixture.

15 Claims, 19 Drawing Sheets

TANGENT GRADIENT CONCENTRATION MATERIAL FOR BATTERY, DIGITAL GRADIENT CONCENTRATION MATERIAL FOR BATTERY

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention

BACKGROUND OF THE INVENTION

1. Field of the Invention

This invention relates to cathodes and processes for making cathodes; more specifically, this invention relates to a tangent gradient concentration material and a method for making the material for batteries.

2. Background of the Invention

Electrification of vehicles is heavily dependent on the development of materials that would enable energy storage systems with substantially superior energy density, cycle life, and safety compared to those provided by the state-of-the-art batteries. Cathode materials used in currently conventional lithium-ion batteries are not suitable for long range distances (500 km) if reasonably sized battery packs are to be maintained. Thus, cathode materials with higher energy densities have become a major concern, and many efforts have been made to develop new cathode materials over the past few decades.

Nickel-rich cathodes exhibit high specific capacity of approximately 200 mAh/g-oxide. Such materials are attractive for use in plug-in hybrid electric vehicles due to such high capacity and their relatively lower costs. (I.e., cobalt is more than five times more expensive than nickel.)

As to nickel, significant challenges remain to improve capacity retention during cycling and thermal-abuse tolerance. In order to solve these problems, various methods have been proposed. For example, a technique has been proposed in which a metal oxide such as Na, K, Mg, Ca, Sr, Ni, Co, Si, Ti, B, Al, Sn, Mn, Cr, Fe, V, Zr, Ge, Ga, etc. is coated on a particle surface to produce an active cathode material. The materials coated on the surface of the particles are often electrochemically inactive, thus reducing the capacity. Further, since the surface coating is formed with a very thin layer, it is difficult to completely protect the internal material from side reactions with the electrolyte. The degradation of capacity loss and thermal stability is still a problem, and low rate capacity and impedance growth problems in charge and discharge cycles must be considered.

Concentration gradient cathode materials have been investigated. These materials show a gradual decrease of nickel concentration and a concomitant increase in manganese concentration from the center towards the outer layer of the cathode particle. Specifically, the nickel concentration decreases and the manganese concentration increases linearly toward the particle surface. FIG. 1 depicts this state of the art paradigm. These configurations provide both reasonable specific capacity values of a nickel-rich core, and improved structural stability due to a manganese-rich surface. FIG. 1 shows a linear decrease of Ni from the center of particle of the concentration gradient cathode material to the surface of the particle, which reduces the total amount of Ni in the particle to about 47 percent. There is no discrete or abrupt change in concentrations between constituents in these linear models, rather the, concentrations of waning elements within a primary particle and/or cathode material gradually decrease as concentrations of waxing elements gradually increase. As such, this state of the art is not optimized for maintaining high concentrations of desired elements until the very point where they are no longer needed in a particle construct.

Layered Ni-rich manganese cobalt (NMC) materials, such as LiNixMnyCozO2 ($x \geq 0.6$, $x+y+z=1$) compounds are attracting attention as cathode materials for rechargeable lithium batteries (LIB) with high capacity over 200 mAh/g-oxide. However, there are some disadvantages, such as reduced capacity during cycling and low thermal shock tolerance at high temperatures, which prohibits practical batteries. Also, in the high temperature state, the reduction of Ni ions during thermal heating releases oxygen from the crystal structure, causing thermal runaway and a violent reaction with the combustible electrolyte.

As such, significant challenges remain to improve capacity retention during cycling, thermal-abuse tolerance, and fast charging and discharging capability of this material. To improve the electrochemical performance and stability of this kind nickel-rich NMC cathode material, concentration gradient cathode materials have been investigated. The material in this series shows a linear decrease in nickel content with high capacity from the particle center toward the particle surface and an increase in manganese content with high stability from the particle center toward the particle surface. Specifically, the linear decreases of nickel concentration from the center towards the outer layer of state of the art particles as depicted in FIG. 1 limits the overall amount of nickel concentration. Therefore, in order to maintain the high capacity of the material while ensuring stability, a thin but sufficiently stable pulsed compositional change must be given to adjacent areas of the particle surface. For example, while the particle core has a nickel/manganese/cobalt concentration of 90/5/5 percent respectively, these concentrations are 33/33/33 at the particle's periphery or surface. This linear reduction limits the overall nickel concentration to 47 percent, which in turn limits the electrochemical capacity of the active particle material.

Another problem that arises when the concentration of Ni decreases linearly from the particle center to the particle surface is that the precursors needed for these cathodes cannot be produced in a continuous production process. Therefore, batch type processes are used, which seriously lowers the economics of material production. In the case of cathode particles with pulsed compositional changes near the particle surface, the necessary precursors can be produced by a continuous synthesis process.

In recent years, lithium- and manganese-rich cathode materials, described as $xLi_2MnO_3 \cdot (1-x)LiMO_2$ (LMR-NMC, M=Mn, Ni, Co, etc., $0<x<1$), have been attracting attention as an active battery material for lithium ion batteries because they can show a promising capacity of 300 mAh/g-oxide or more. This material can provide a high specific capacity, so when paired with an advanced anode material, the battery pack energy density is close to a very high level of 1000 Wh/kg. In addition, lithium- and manganese-rich cathode materials are economically attractive due to their high content of manganese, which is much cheaper and less toxic than cobalt.

This high capacity material also has some disadvantages. Examples of some important drawbacks are large irreversible capacity loss in the first cycle due to the release of oxygen and Li from its lattice, poor rate capability related to low electronic conductivity because of the Mn4+ ions and thick SEI layer formed by the reaction of the cathode surface with the electrolyte, insufficient cycling performance under high cut-off charge voltages, and gradual voltage decay during cycling process.

In order to solve the problems of lithium- and manganese-rich cathode materials, surface coating or doping methods are applied as in the case of Ni-rich NMC materials, but for the same reason, it is still difficult to completely solve the problems.

A need exists in the art for a cathode and a production method for producing a cathode particle wherein the overall amount of nickel concentration is approximately doubled that of state of the art systems (such that the cathode defines a concentration gradient material). The resulting cathode particle should retain its structural integrity conferred by high strength components (such as NMC33/33/33) to confer a longer life cycle. Specifically, a need exists in the art for Ni-rich NMC and LMR-NMC materials and a production method for producing these battery materials wherein capacity loss and deterioration of thermal stability during cycling need to be mitigated. The resulting battery materials should retain higher capacity, longer life, low impedance growth and improved electrochemical performance during charging and discharging cycles by giving integrity the particle structure.

SUMMARY OF INVENTION

An object of the invention is to provide a cathode material and a method for making the material that overcomes many of the drawbacks of the prior art.

Another object of the invention is to provide a cathode particle and a method for making the particle, having optimized specific capacities. A feature of the invention is the formation of tangent gradient concentrations of particle constituents. An advantage of the invention is the maximizing (e.g., doubling) of specific capacities and the maintaining of structural integrity of the particle.

Another object of the invention is to provide an active battery material and a method for making the material, having optimized specific capacity and thermal stability. A feature of the present invention is the formation of a pulsed compositional change in a high stability composition on the surface of a particle of a high capacity material of Ni-rich NMC or LMR-NMC composition. An advantage of the present invention is that a high capacity composition imparts a pulsed compositional change of a high stability composition to the surface of the particles to simultaneously satisfy the high capacity and thermal stability of the entire material.

Still another object of the invention is to provide a cathode material and a method for making the material, whereby the material has a longer useful life. A feature of the present invention is to establish a paradigm that is variously stacked in the form of a pulsed compositional change on the surface of individual particles. One example is the tangent gradient concentration change to the high stability composition as it approaches the particle surface. Another feature of the invention is the establishment of a layered-layered paradigm within the individual particles comprising the electrode used in lithium ion batteries. An advantage of the invention is that the resulting construct has improved structural stability for longer cycle lifetimes of a battery incorporating the cathode material.

Yet another object of the invention is to provide a cathode material and a method for making the material, whereby the material has low impedance growth. A feature of the present invention is that a material having a low side reaction with an electrolyte and having a rapid diffusion rate of lithium ions is stacked on the particle surface in the form of a pulsed compositional change. An advantage of the invention is that the resulting construct has mitigated impedance growth to enable longer cycle life and to lower the cooling requirements of the battery pack.

Another object of the present invention is to provide a method for making a cathode active material for a lithium ion battery. A feature of the present invention is a continuous synthesis process in which precursors of a high capacity base material are synthesized in a first reactor and precursors of a high stability material are stacked thereon in pulsed change form in the same or another reactor. For example, the method uses one or more co-precipitation reactors to form a base region and a pulse region within a cathode particle. An advantage of the invention is that as the pulse composition increases, the concentration of the constituents in the base region decreases. Another advantage of the present invention is that multi reactors are used to continuously produce materials with pulsed compositional changes near the particle surface to increase the economic feasibility dramatically. Still another advantage of the present invention is to determine the content of the base composition to achieve high capacity in the first reactor and to determine the content and the stacking paradigm of the pulsed compositional change to enable high stability in the subsequent reactors.

Another object of the present invention is to provide cathode material exhibiting digital gradient concentration strata, those strata comprised of primary particles. A feature of the invention is the step change in concentration of base region and pulse region constituents of the cathode, wherein the number of digital layers is between 1 and 8, and more preferably between 1 and 4. An advantage of the invention is that the digital concentration construct can be produced continuously using continuous stirred tank reactors to optimize the economic feasibility of the material.

Briefly, the invention provides an active battery material comprising pulsed compositional changes near the particle surface. For example, the invention provides a cathode active material containing primary particles with varying concentrations in each particle and having non-linear changes in concentrations of a first base region and a second pulse region. These non-linear changes are therefore not gradual but rather abrupt, discrete changes, such as to effect step-wise, or tangential changes in constituent concentrations.

Specifically, the invention provides a secondary active battery material particle containing primary particles in a base phase and a pulse phase, wherein the primary particles constituting the pulsed compositional change layer of the secondary particle have a compositional change in each primary particle so that they are connected to each other to form a pulsed compositional change layer of the secondary particle in the form of a continuous or discontinuous concentration change pattern, wherein components are selected from the group consisting of Li, B, C, Na, Mg, Al, Si, Ca, Ti, V, Cr, Mn, Fe, Co, Ni, Cu, Zn, Ga, Ge, Sr, Zr, Nb, Mo, Ag, Sn, Ba or a combination thereof.

Also provided is a method for preparing a cathode active material, the method comprising supplying chelating agent, aqueous basic solution and a first aqueous metal salt solution to a reactor to create a base region; supplying a second aqueous metal-salt solution to a reactor to form a pulse region, wherein the second aqueous metal-salt solution is intermittently or continuously added during or after the creation of the base region to synthesize a gradient construct; thermally treating the base region and the pulse region to create active metal precursors; mixing the precursors with lithium salt to produce a mixture; and thermally treating the mixture.

An embodiment of the method for preparing a cathode active material comprises supplying chelating agent, aqueous basic solution and a first aqueous metal salt solution to a reactor to create a base material; supplying a second aqueous metal-salt solution to the reactor to form a pulse material, wherein the second aqueous metal-salt solution is added during the creation of the base region to create a gradient construct; thermally treating the gradient construct to create active metal precursors; mixing the precursors with lithium salt to produce a mixture; and thermally treating the mixture.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION OF THE INVENTION

Figure 1:
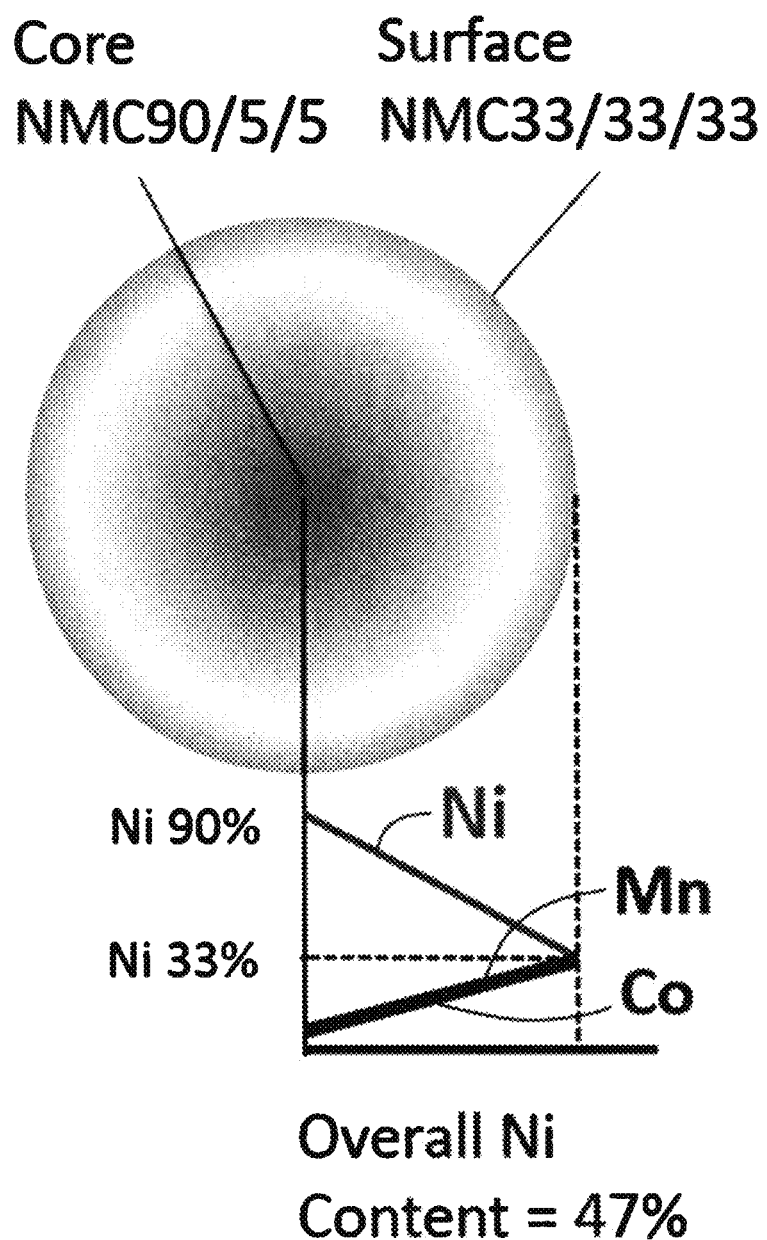
FIG. 1 is a schematic elevational view of a Ni-rich NMC cathode particle exhibiting full concentration gradient composition.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

An active battery material with pulsed compositional changes near the particle surface, method for producing the same, and lithium secondary battery comprising the same is provided.

Specifically, the present invention relates to a cathode material (i.e., secondary particle) or its precursor for a lithium-ion battery prepared by co-precipitation method using batch reactor or continuous reactor or Taylor Vortex reactor or their combined systems. The cathode material or its precursor embodies a new structure with pulsed compositional changes near the particle surface which increases the capacity, thermal stability and cycle life of the material and reduce its impedance growth to enable lower cooling requirements of the battery pack.

The cathode material is obtained by mixing its precursor and a lithium source and then sintering the mixture. This cathode material comprises a plurality of primary particles forming a plurality of secondary particles. This plurality of secondary particles forms the cathode powder. As such, each cathode particle, a secondary particle of 3 to 30 microns in size, consists of a number of primary particles of submicron size. Preferred submicron sizes range from 200 nm to 600 nm.

Figure 2:
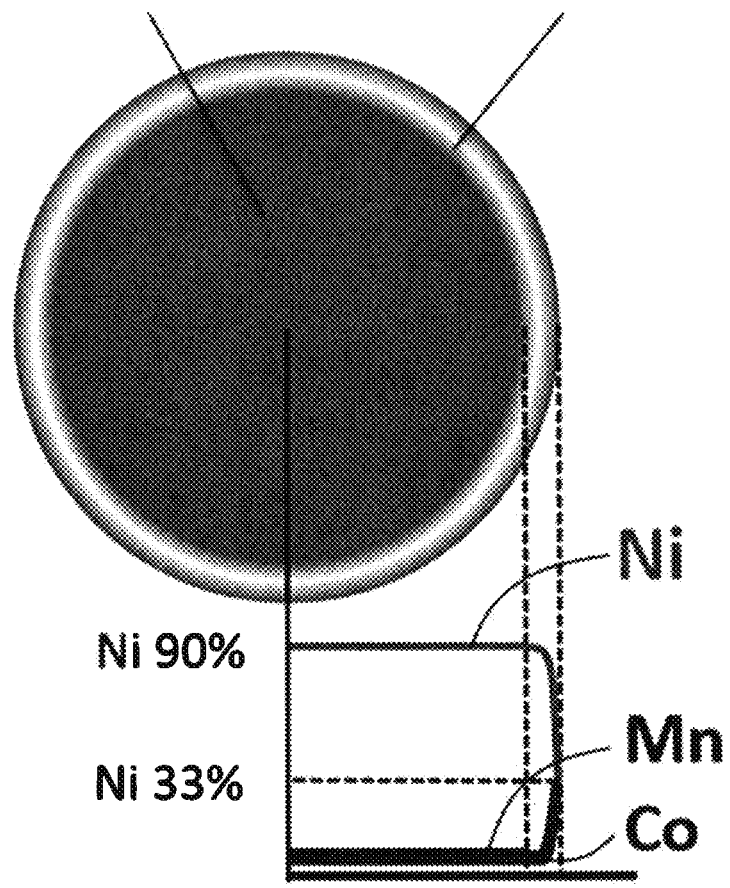
FIG. 2 is a schematic elevational view of a Ni-rich NMC cathode particle exhibiting tangent concentration approach as a pulsed compositional change near the particle surface, in accordance with features of the present invention.
Figure 3:
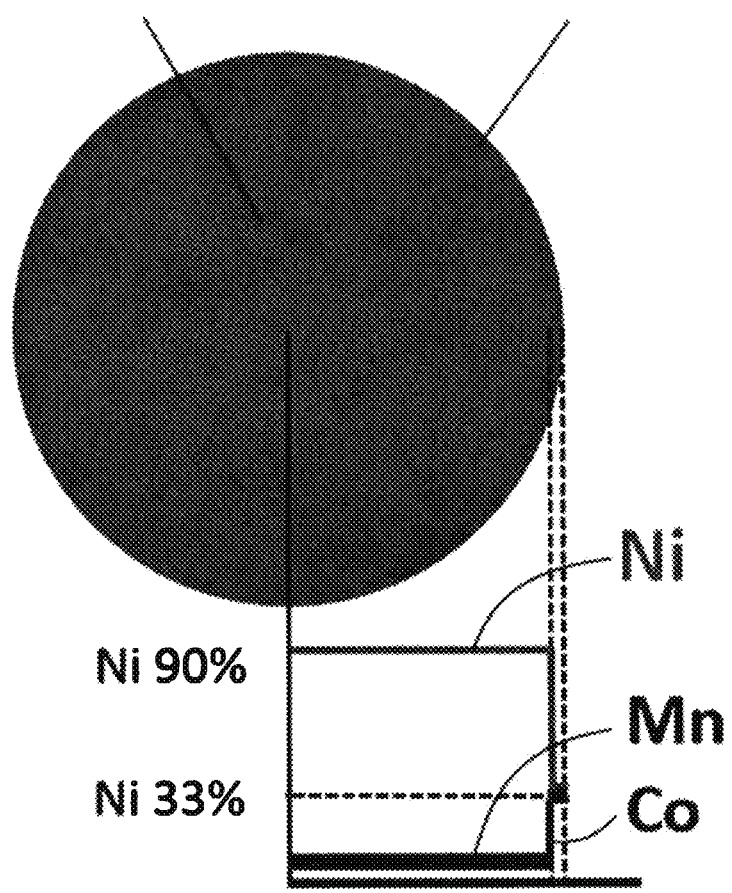
FIG. 3 is a schematic elevational view of a Ni-rich NMC cathode particle exhibiting step concentration approach as a pulsed compositional change near the particle surface, in accordance with features of the present invention.

As discussed supra, a clear disadvantage of the full concentration gradient material developed is that the amount of Ni that determines the capacity is lowered by linear Ni reduction. In order to overcome this disadvantage, and as shown in FIG. 2, the invented cathode particle provides pulsed compositional changes near the particle surface. Most of the particle center comprises a high-capacity composition. Only a portion of the particle surface is changed to a high-stability composition in an optimal pattern. In this way, the total amount of Ni can be made 80 weight percent or more.

As depicted in FIG. 2, the concentration of the first compound in the pulse region decreases and the concentration of the second compound increases from the center to the periphery of the particle. Generally, from the center to the periphery of the particle, at least one component decreases, increases, disappears, or appears.

The pulse phase exhibits increased or decreased concentrations of at least one composition in the form of sine, square, step, triangle, sawtooth, exponential and combinations thereof. The thickness or the composition concentration of a pulse region varies with the shape and size of the secondary particle. The secondary particles may be spherical, non-spherical, elliptical, oval, convex, concave clustered in shape, and combinations thereof. The pulse region may have a thickness of 500 nm or less, one or more of which may be continuous, and consist of the same or different composition, concentration and width.

Figure 4:
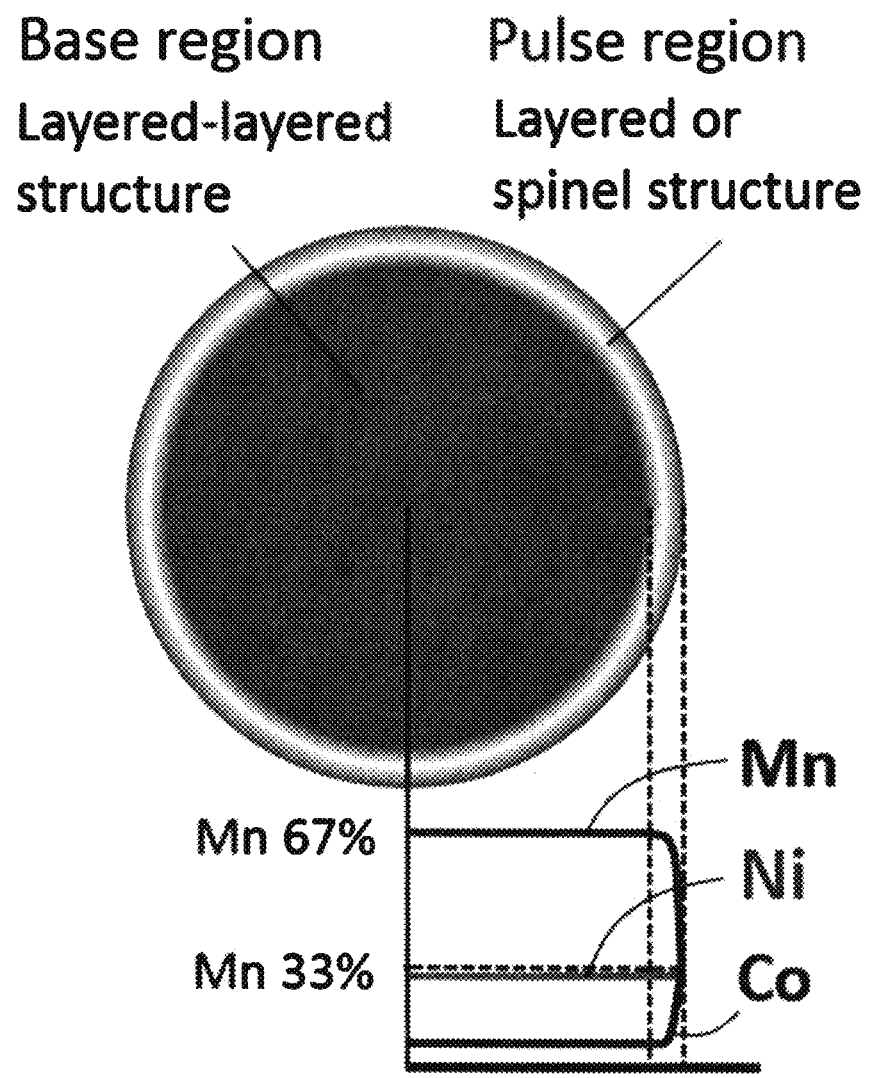
FIG. 4 is a schematic elevational view of a cathode particle composed of layered-layered cathode and layered or spinel cathode exhibiting tangent concentration approach as a pulsed compositional change near the particle surface, in accordance with features of the present invention.

As shown in FIGS. 2 and 4, the inventive cathode material can be applied to high-capacity materials such as NMC90/5/5 and layered-layered LMR-NMC for a base region. NMC33/33/33 and layered-layered-spinel compositions having high stability can be used for pulse regions.

The lithium concentration in the pulse region is equal to or smaller than the lithium concentration in the base region. When it is small, it decreases correspondingly to the degree to which the composition of the base region is replaced by the composition of the pulse region. As shown in FIG. 4, by constituting the base region of the lithium- and manganese-rich material containing $Li_2MnO_3$ and the pulse region of the stable NMC33/33/33, lithium gradually decreases in the pulse region.

Figure 5:
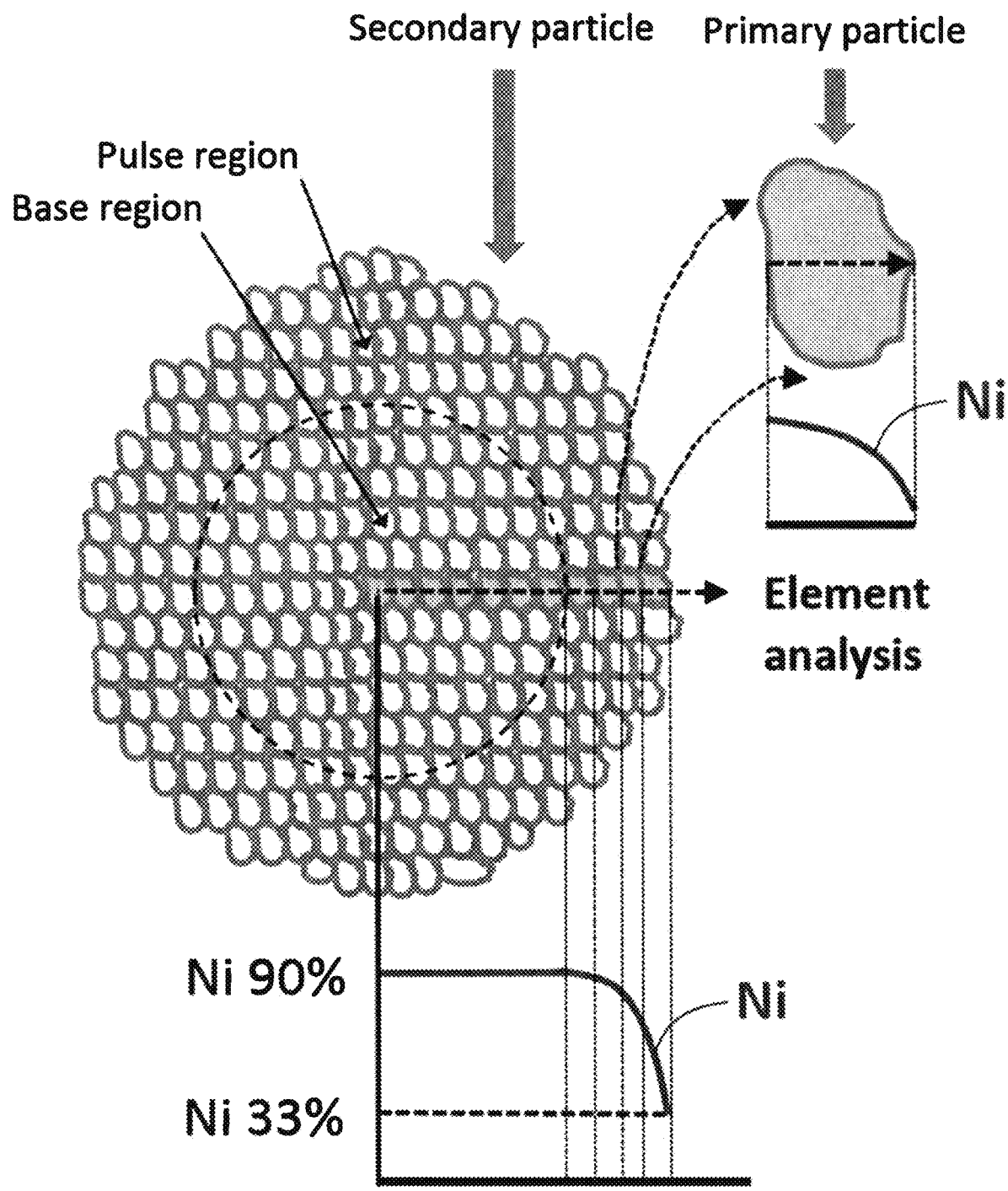
FIG. 5 is a schematic elevational view of a secondary cathode particle composed of primary particles forms a pulsed compositional change near the particle surface due to a compositional change of each primary particle located near the particle surface, in accordance with features of the present invention.

As shown in FIG. 5, each primary particle located in the base region of the secondary particle is composed of a high-capacity material. Each primary particle located on the surface of the secondary particle consists of a high stability and/or a high conductivity material. Thus, each primary of a pulse region existing between the base region of the secondary particle and the surface is gradually changed from a high-capacity material to a high-stability and/or high-conductivity material. As such, each primary particle that constitutes a pulsed compositional change layer near the surface of secondary particles may have a pulsed compositional change in itself.

As shown in FIG. 5, the primary particles constituting the pulsed compositional change layer of the secondary particle have a compositional change in each primary particle so that they are connected to each other to form a pulsed compositional change layer of the secondary particle in the form of a continuous or discontinuous concentration change pattern.

The concentration of the first compound is constant in the base phase but decreases in the pulse phase. Generally, at least one or more components from the center of the particle to the periphery will decrease, increase, disappear, or appear. As depicted in FIG. 5, at the center of the second particle, the nickel remains constant at 90%, then decreases continuously or discontinuously to 33% in the pulse phase near the second particle surface.

In addition to nickel, the component that decreases, increases, disappears or appears can be selected from the group consisting of Li, B, C, Na, Mg, Al, Si, Ca, Ti, V, Cr, Mn, Fe, Co, Cu, Zn, Ga, Ge, Sr, Zr, Nb, Mo, Ag, Sn, Ba or a combination thereof.

The compositional change in each of the primary particles exhibits increased or decreased concentrations of at least one composition in the form of sine, square, step, triangle, sawtooth, exponential curve, tangent approach and combinations thereof. Similarly, the pulsed compositional change near the secondary particle surface exhibits increased or decreased concentrations of at least one composition in the form of sine, square, step, triangle, sawtooth, exponential curve, tangent approach and combinations thereof. The thickness of pulsed compositional change layer varies with the shape and size of the primary and secondary particles, and the number of primary particles comprising the pulse region.

The primary particles in the base phase and pulsed compositional change layer may have a shape selected from the group consisting of leaf, needle, plate, polyhedron, sloped polyhedron, slanted polyhedron, curved polyhedron, ellipse, and combinations thereof. The secondary particles may be spherical, non-spherical, elliptical, oval, convex, concave, clustered in shape, and combinations thereof.

Figure 7:
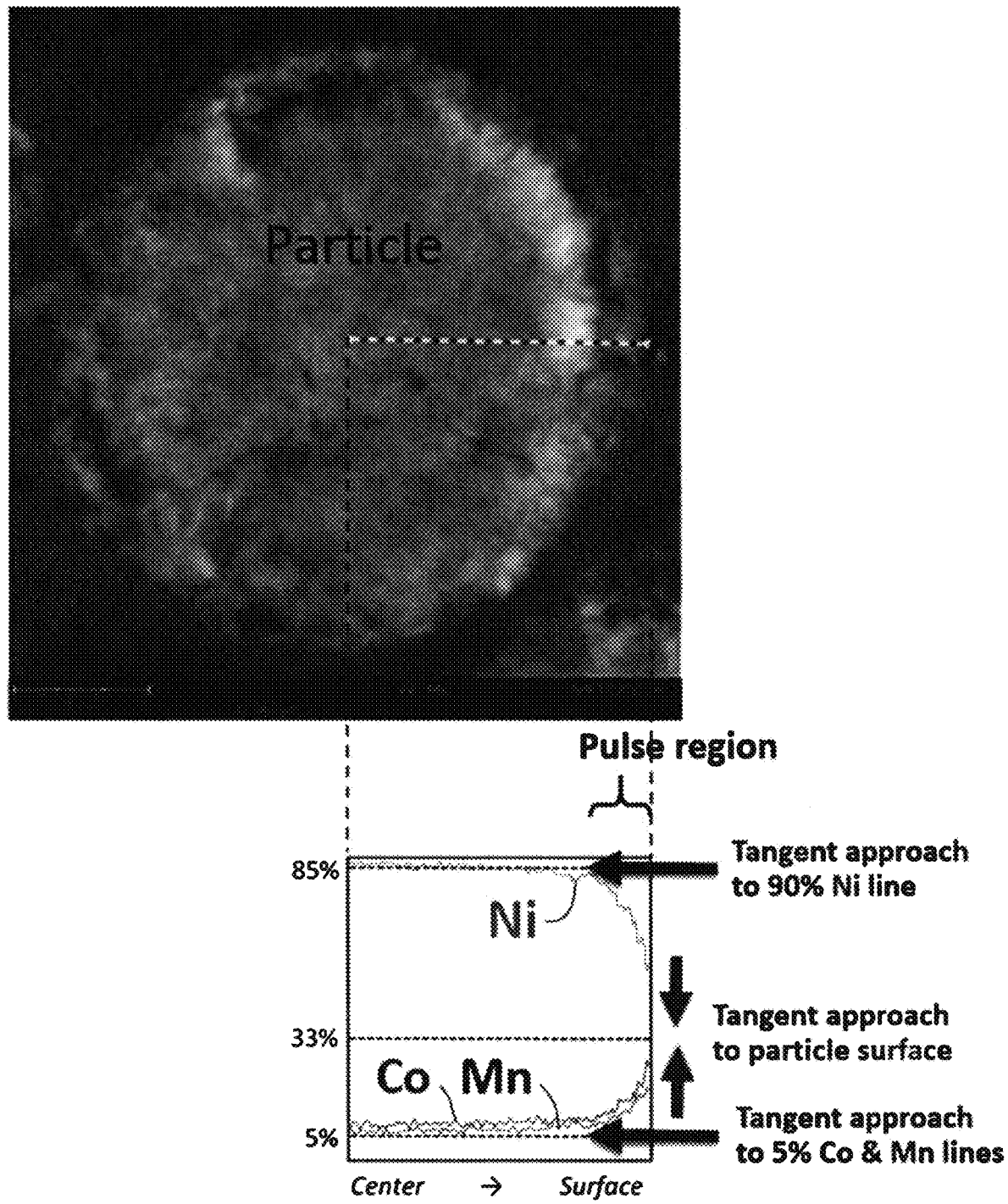
FIG. 7 is a detailed SEM-EDS elemental mapping image of an actual synthesized Ni-rich NMC cathode particle exhibiting tangent concentration approach as a pulsed compositional change near the particle surface, in accordance with features of the present invention.
Figure 8:
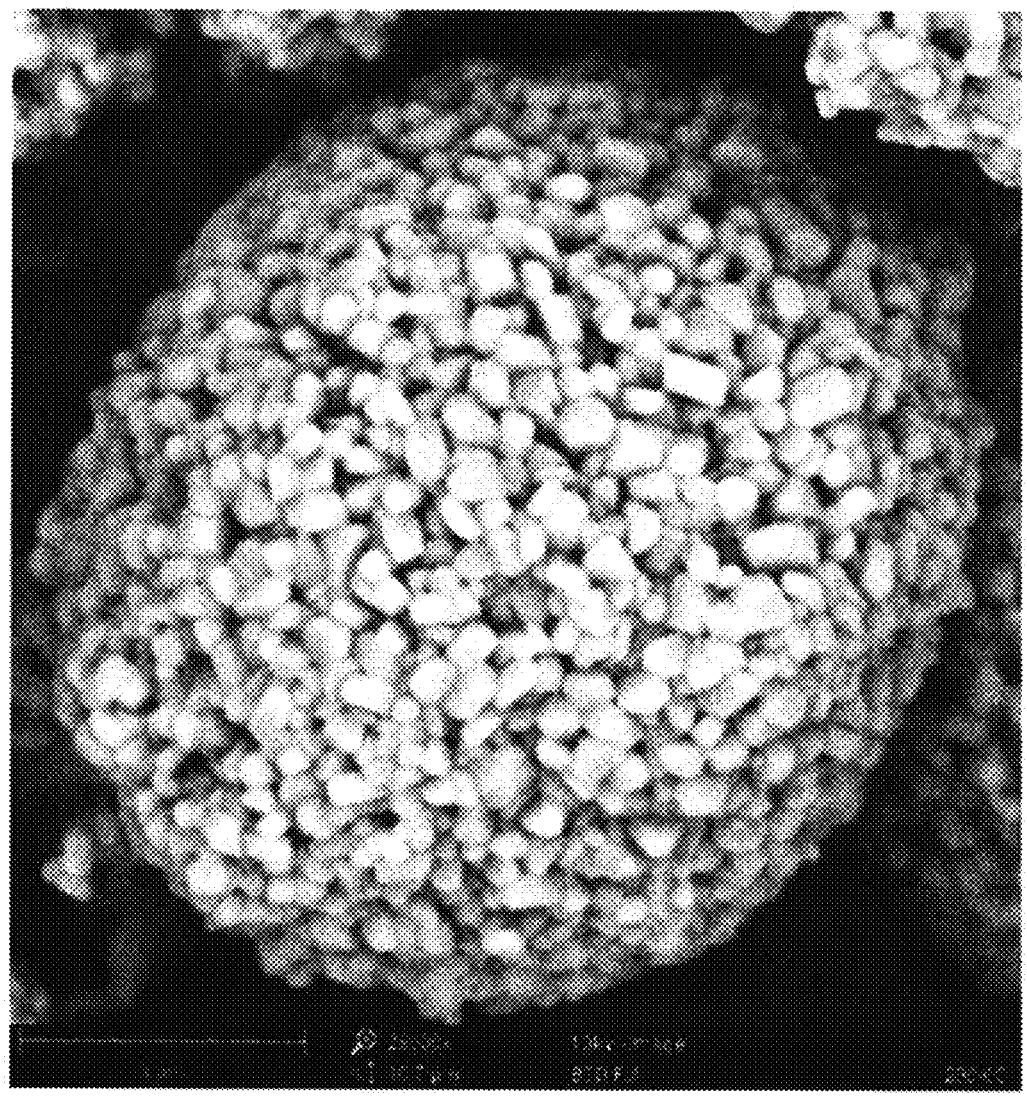
FIG. 8 is a detailed SEM image of an actual synthesized Ni-rich NMC cathode particle exhibiting step concentration approach as a pulsed compositional change near the particle surface, in accordance with features of the present invention.

FIG. 7 is an annotated SEM image of a secondary particle and its elemental analysis. This particle is approximately 10 microns in diameter. The overall amount of nickel concentration in the particle is maximized since nickel-rich NMC90/5/5 phase is kept constant in the base phase within secondary particle and just proximal to the adjacent point of the base phase of secondary particle but then decreases tangentially to NMC33/33/33 phase at the particle surface of the gradient layer. The overall nickel content of the resulting particle is more than 80 percent compared to the roughly 47 percent concentration seen in state of the art particles as shown in FIG. 1.

Figure 6:
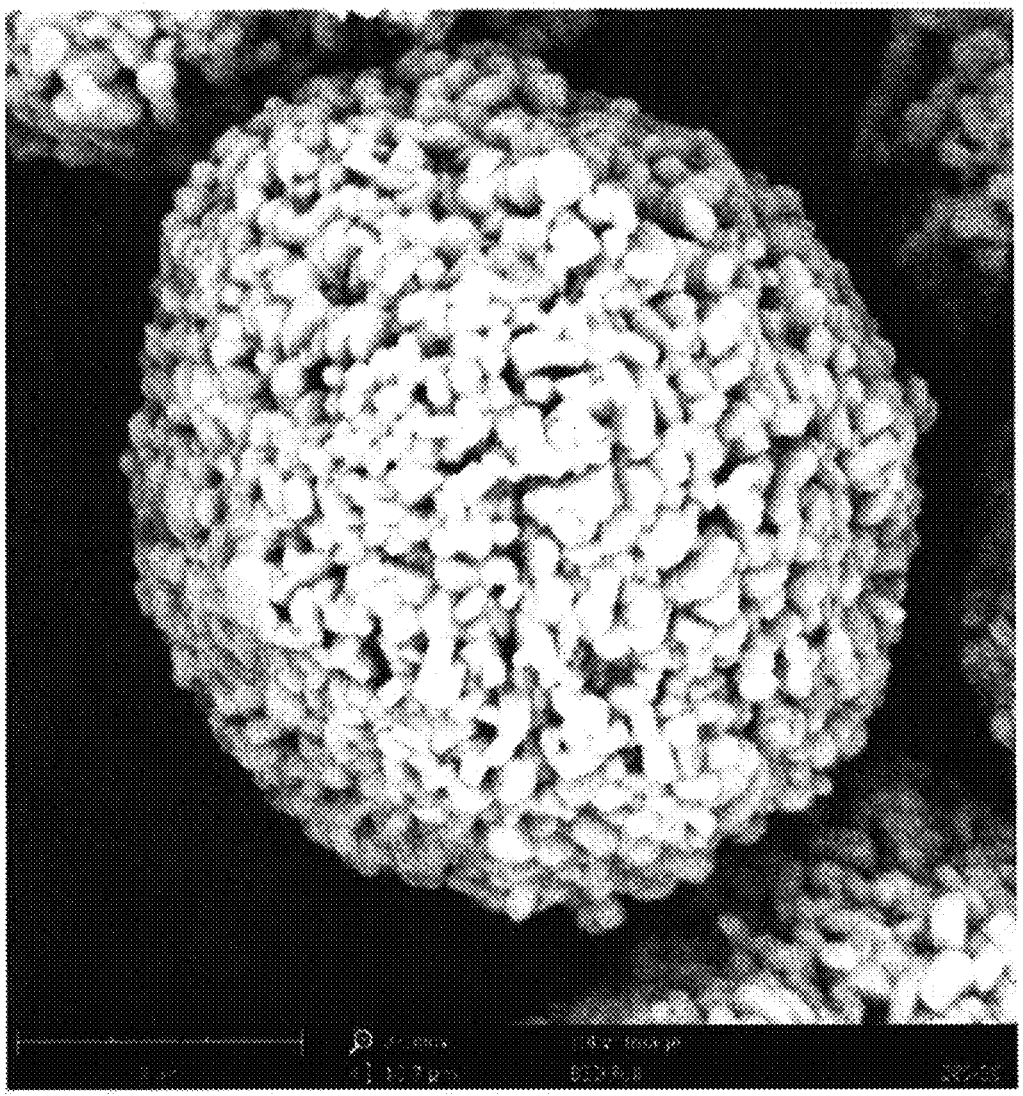
FIG. 6 is a detailed SEM image of an actual synthesized Ni-rich NMC cathode particle exhibiting tangent concentration approach as a pulsed compositional change near the particle surface, in accordance with features of the present invention.

The cathode particle, secondary particle, comprise the primary particles having a shape selected from the group consisting of leaf, needle, plate, polyhedron, sloped polyhedron, curved polyhedron, slanted polyhedron, ellipse, and combinations thereof as can be seen from SEM images of FIGS. 6, 8, 10 and 12. They are distributed in a random direction between the center of the secondary particle and the surface as shown in FIGS. 5 and 6.

FIG. 7 shows the tangent approach. By using this pattern, the base material content of the secondary particle can be maximized.

Figure 9:
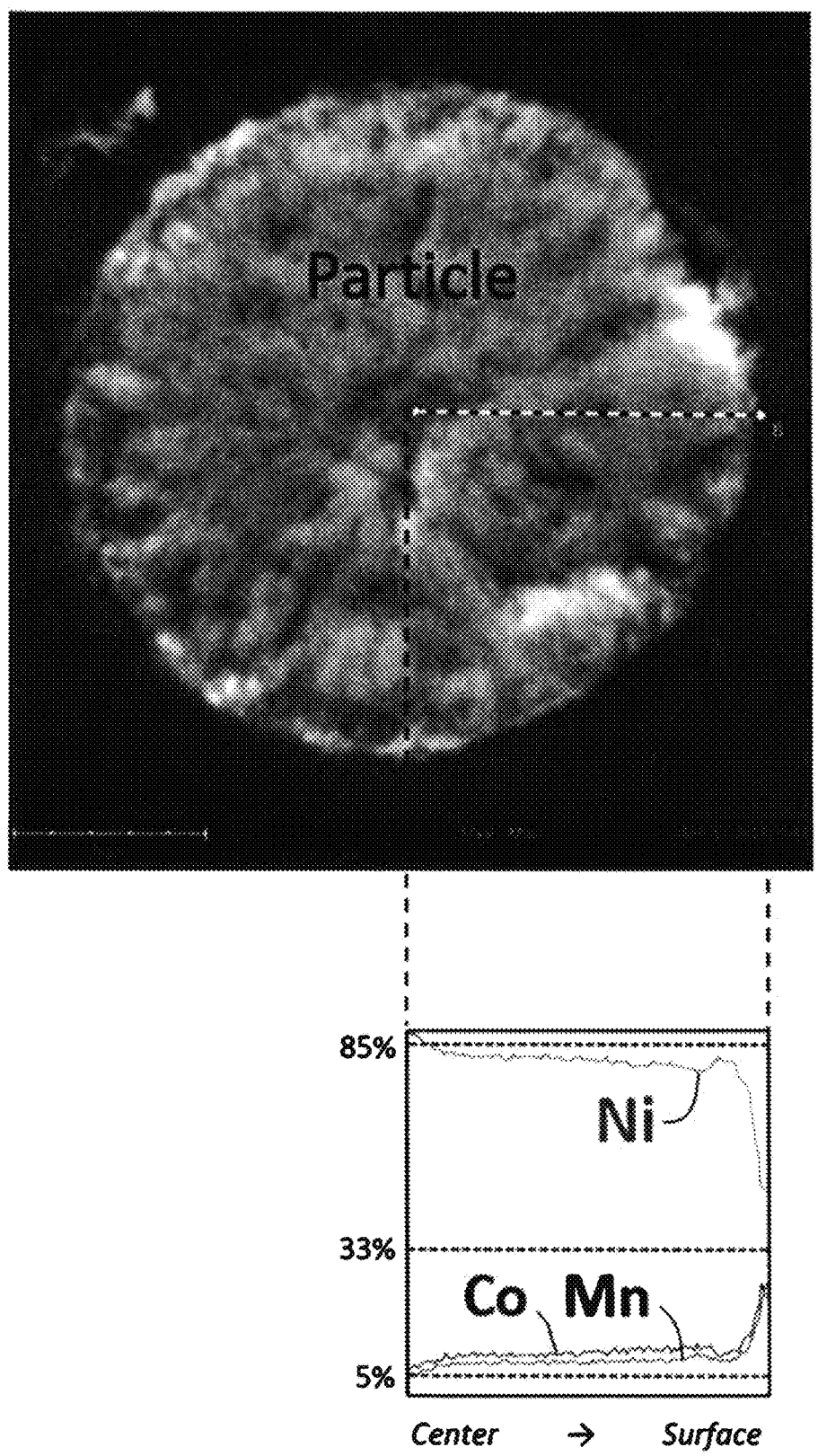
FIG. 9 is a detailed SEM-EDS elemental mapping image of an actual synthesized Ni-rich NMC cathode particle exhibiting step concentration approach as a pulsed compositional change near the particle surface, in accordance with features of the present invention.
Figure 10:
FIG. 10 is a detailed SEM image of an actual synthesized Ni-rich NMC cathode particle exhibiting multi-step concentration approach as a pulsed compositional change near the particle surface, in accordance with features of the present invention.

FIG. 9 shows the step approach. By using this pattern, it is possible to change the composition into the pulse phase more quickly, thereby minimizing the thickness of the pulse phase and maximizing the stability effect of protecting the base phase.

Figure 11:
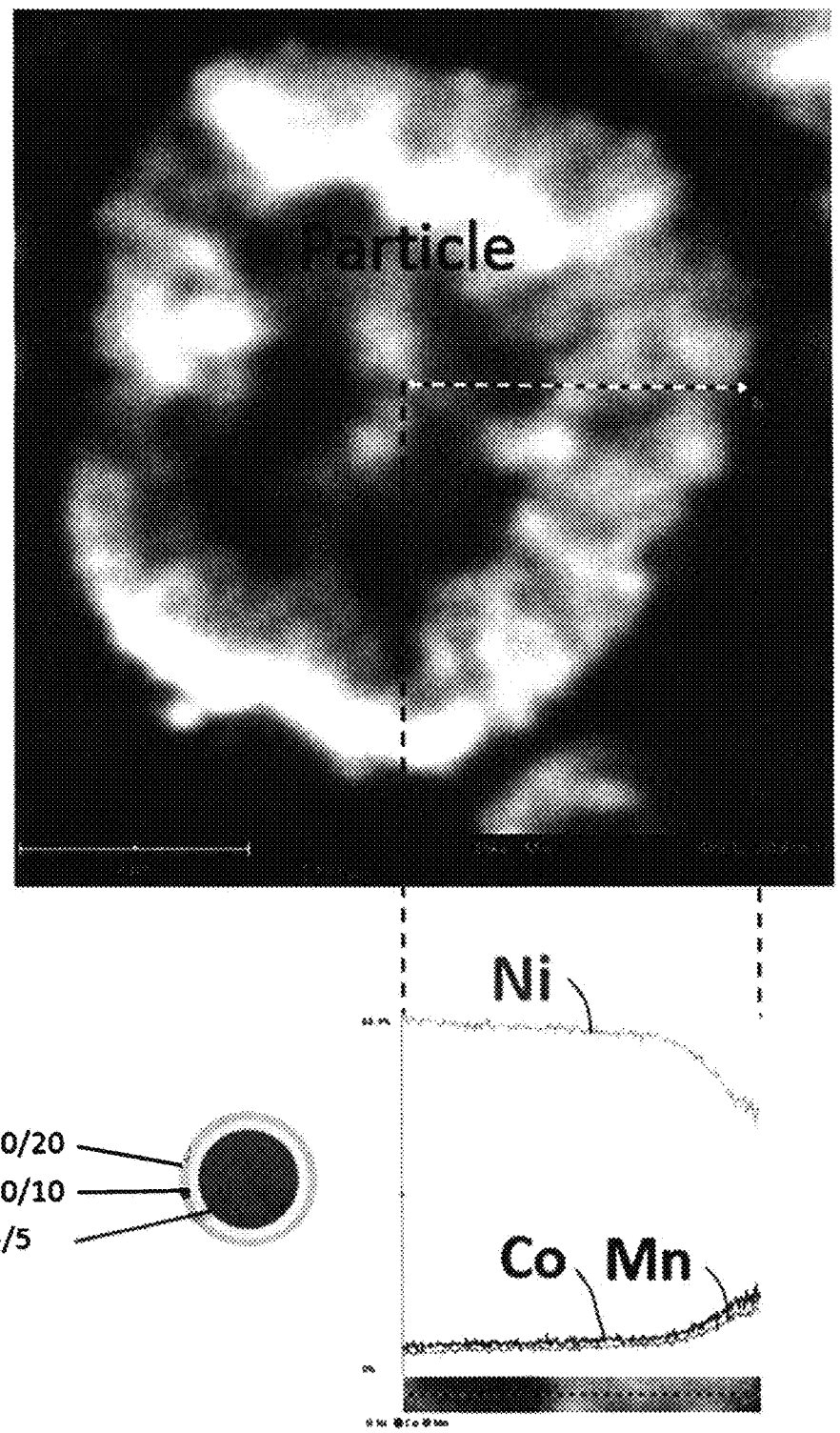
FIG. 11 is a schematic elevational view and a detailed SEM-EDS elemental mapping image of an actual synthesized Ni-rich NMC cathode particle exhibiting multi-step concentration approach as a pulsed compositional change near the particle surface, in accordance with features of the present invention.
Figure 12:
FIG. 12 is a detailed SEM image of an actual synthesized LMR cathode particle composed of layered-layered composition and NMC33/33/33 composition exhibiting a pulsed compositional change near the particle surface, in accordance with features of the present invention.

FIG. 11 shows the multi-step approach using 2 kinds of pulse phases. By using this pattern, material stabilization function and the high conductivity function can be simultaneously realized.

FIG. 11 is an annotated SEM image of a secondary particle produced via the invented step-approach. Elemental analysis is also provided. The SEM of this six micron diameter particle shows a step-like phase in concentrations of the nickel, cobalt, and manganese. As depicted in the cross sectional view below the SEM image, the NMC90/5/5 concentration comprises the core phase. NMC80/10/10 phase forms the first pulsed compositional change layer. NMC60/20/20 phase forms the second pulsed compositional change layer proximal to and at the particle surface.

It is noteworthy from FIG. 11 that the nickel concentration only starts to drop off within about 600-900 nm of the particle surface. For example, the inventors found drop of within about 800 nm.

Figure 13:
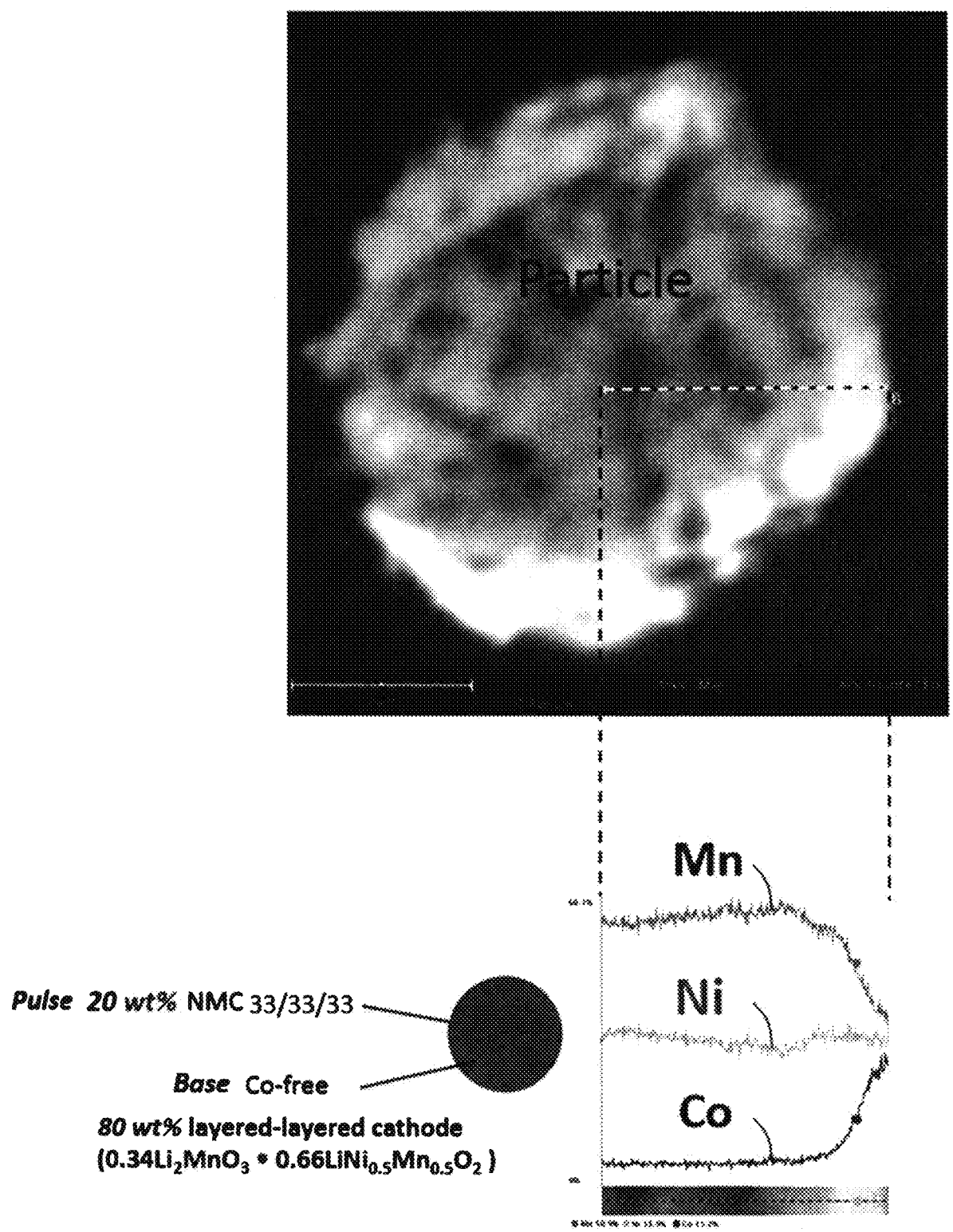
FIG. 13 is a schematic elevational view and a detailed SEM-EDS elemental mapping image of an actual synthesized LMR cathode particle composed of layered-layered composition and NMC33/33/33 composition exhibiting a pulsed compositional change near the particle surface, in accordance with features of the present invention.

FIG. 13 is an SEM image of another 3 phase secondary particle produced via the invented pulsed compositional change method. Below the SEM image is a cross sectional view of the invented particle showing the elemental composition along radially extending strata of the particle. While three primary constituents (Li2MnO3, LiNi0.5Mn0.5O2 and NMC33/33/33) comprise this particle, it prominently features two layers: A layered-layered cathode being the base region, and a NMC33/33/33 cathode defining the pulsed compositional change layer.

FIG. 13 shows that manganese concentration remains constant at high concentration, then gradually decreases in the pulsed compositional change layer near the secondary particle.

The invented Ni-rich NMC materials have higher capacity, cycle life, thermal stability and lower impedance growth than conventional NMC materials with the same overall composition.

Figure 14:
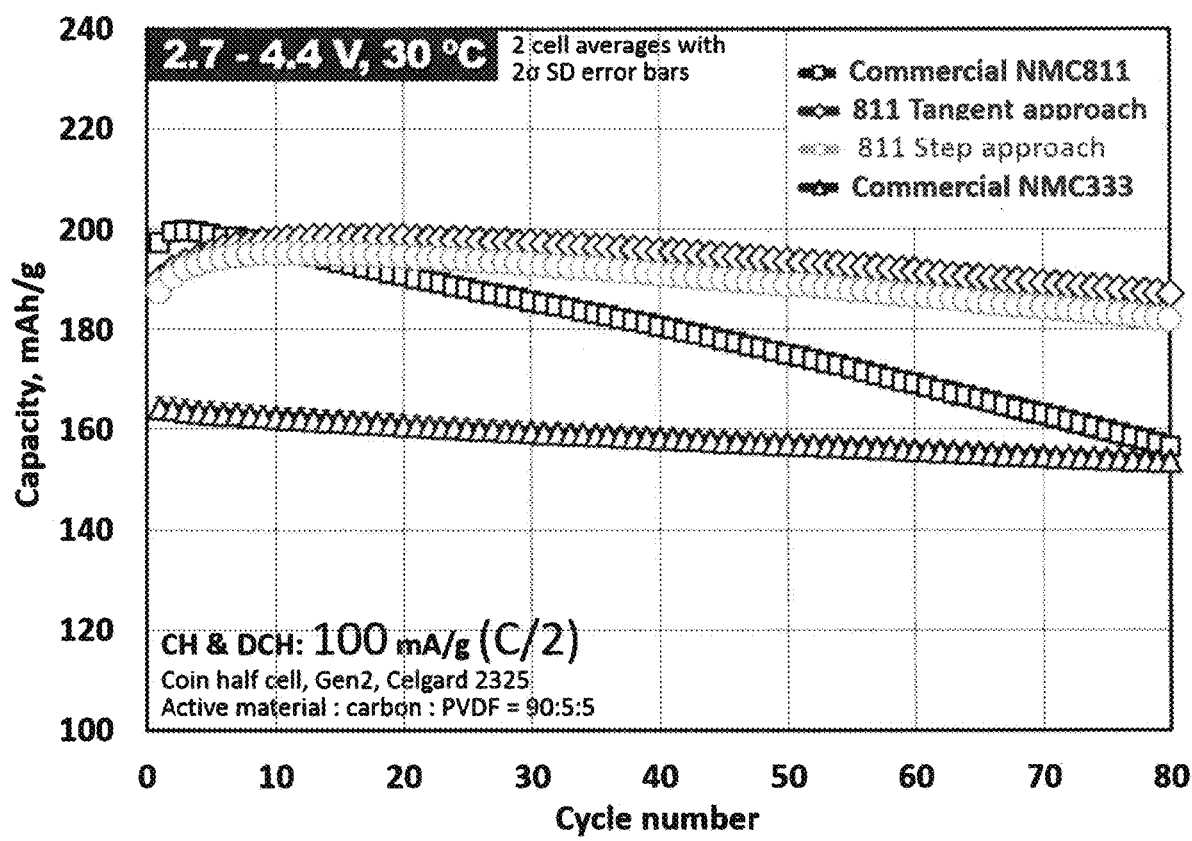
FIG. 14 is graph comparing electro-chemical cycling performance of commercially available common cathodes to the invented cathode materials, in accordance with features of the present invention.

Compared to conventional commercial NMC811 material, the invented tangent-approach and step-approach pulsed compositional change materials provide increased capacity retention, as depicted in FIG. 14.

Figure 15:
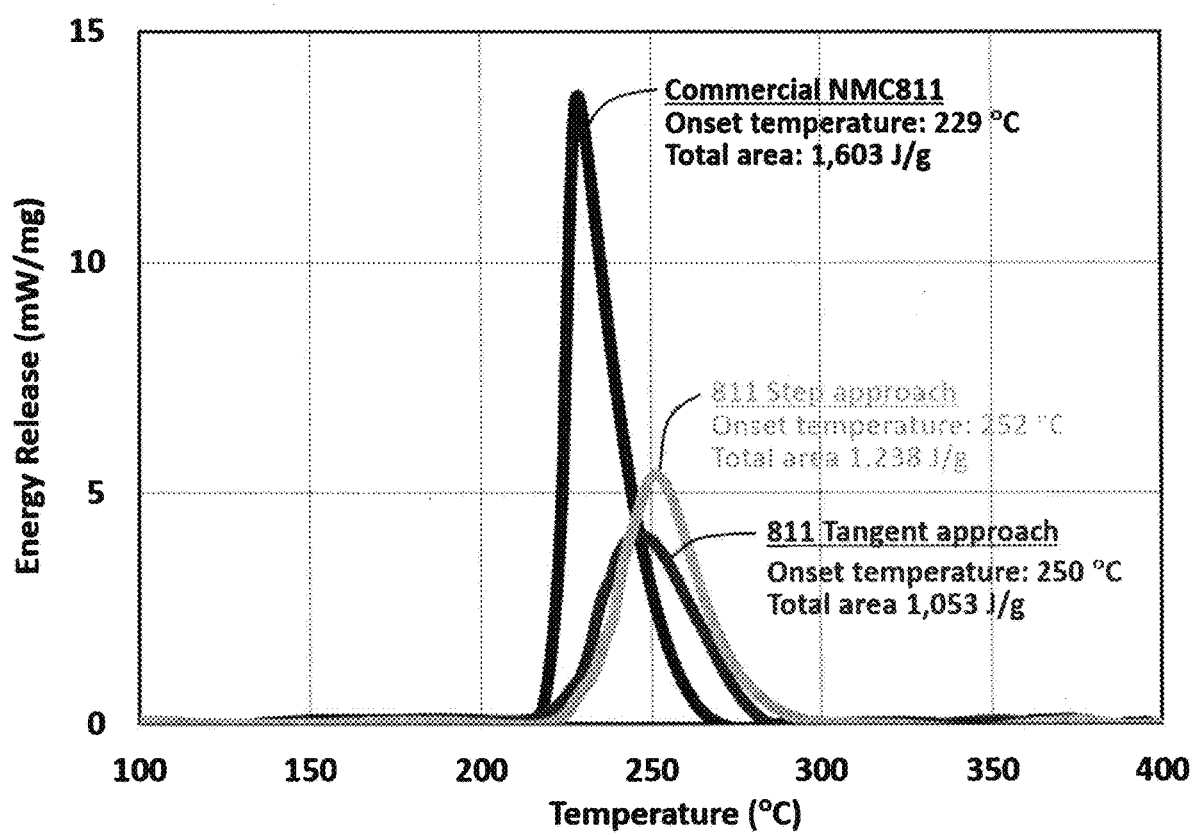
FIG. 15 is graph comparing a thermal stability of commercially available common cathode to the invented cathode materials, in accordance with features of the present invention.

FIG. 15. depicts how these two invented materials exhibit higher onset temperatures and 77 percent (step approach) and 65 percent (tangent approach) reduced energy release by Differential Scanning calorimetry (DSC) thermal analysis.

Figure 16:
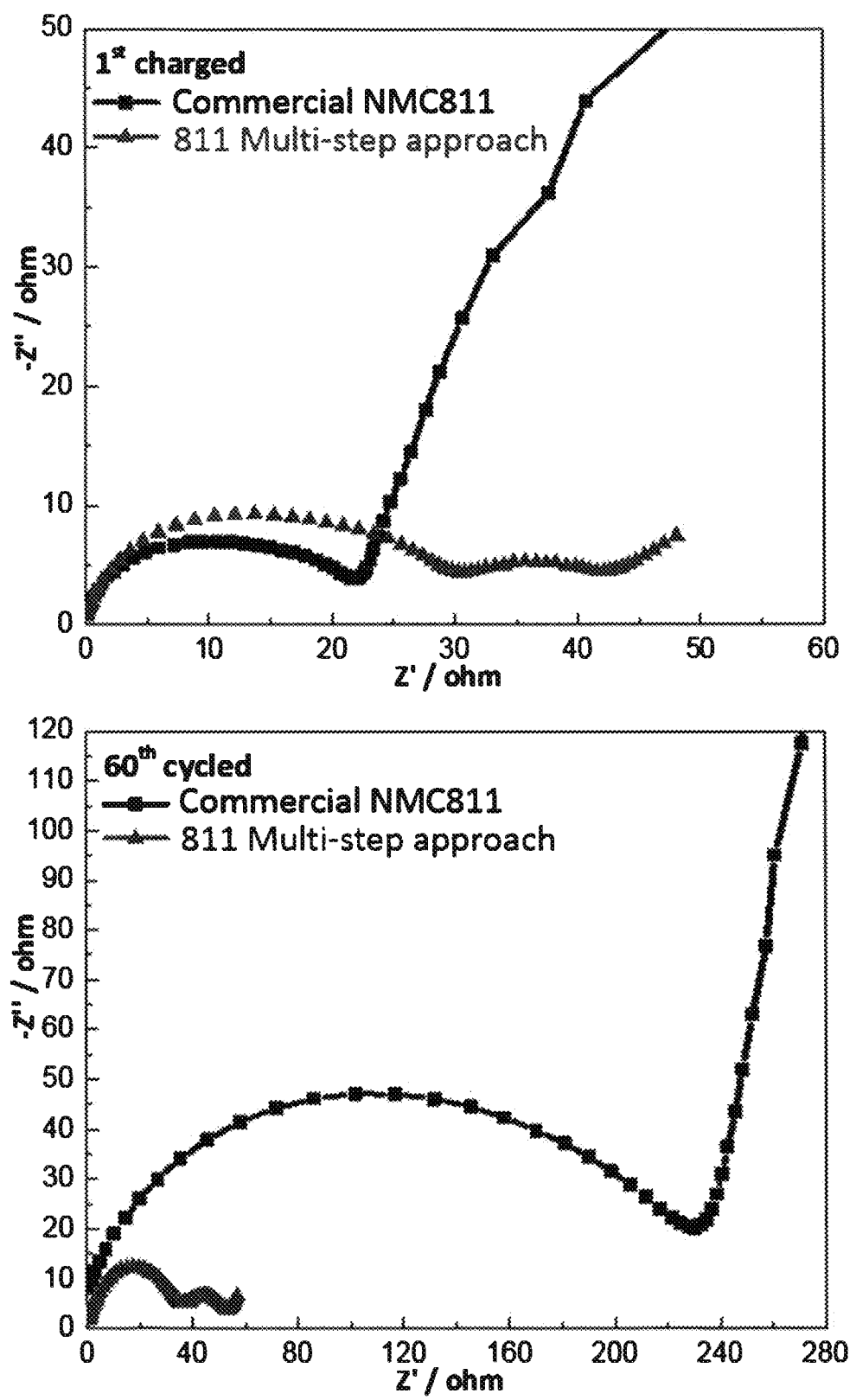
FIG. 16 is graph comparing an impedance growth of commercially available common cathode to the invented cathode material, in accordance with features of the present invention.

The impedance results in FIG. 16 show the improved performance of the invented pulsed compositional change material. The first cycle shows a similar impedance. However, the impedance of the conventional commercial NMC811 material is greatly increased after 60 cycles, whereas the impedance of the invented multi-step-approach pulsed compositional change material is insignificant.

Particle Production Detail

A precursor or a cathode active material (i.e., the secondary particle) for a lithium-ion battery is prepared by co-precipitation methods. A myriad of reactors are suitable for producing the invented materials. For example, the reactor may be of one or more of batch, continuous stirred tank reactor, Taylor vortex reactor, and combinations thereof.

The inventors have found that a typical batch reactor cannot be used to make particles having distinct changes in concentrations of various particle constituents from the center of the particle to the periphery of the particle. Such batch systems lack reproducibility and economic feasibility given that they do not provide steady-state continuous production of particles.

Surprisingly and unexpectedly, the inventors found that a counter intuitive combination of continuous reactors, batch reactors, and Taylor Vortex reactors generate step change concentrations of particle These co-precipitation mechanisms combine base phase and pulse phase primary particles into a single secondary particle. FIGS. 5 and 6 graphically represent a single secondary particle (I.e., a cathode particle) composed of a combination of a base phase and a pulse phase consisting of many primary particles.

In an embodiment of the invention, the primary particles are used to construct the larger secondary particles. Here, the base region of the base phase of the secondary particle is comprised of primary particles, all made of a fixed concentration of selected constituent(s), while each of the pulse phases of the secondary particle may be comprised of primary particles each made of a single element or specified weight percents of a plurality of elements.

In all embodiments, the base phase of secondary particles has no compositional changes, and the pulse phase has a compositional concentration variation in an optimized pattern.

A multi-continuous reactor (such as that described in U.S. Pat. No. 9,446,967 B2, assigned to the instant applicant, and incorporated herein by reference) is combined with two batch reactor systems to generate the secondary particles described herein. This combination is designated in FIG. 17 as numeral 18.

Figure 17:
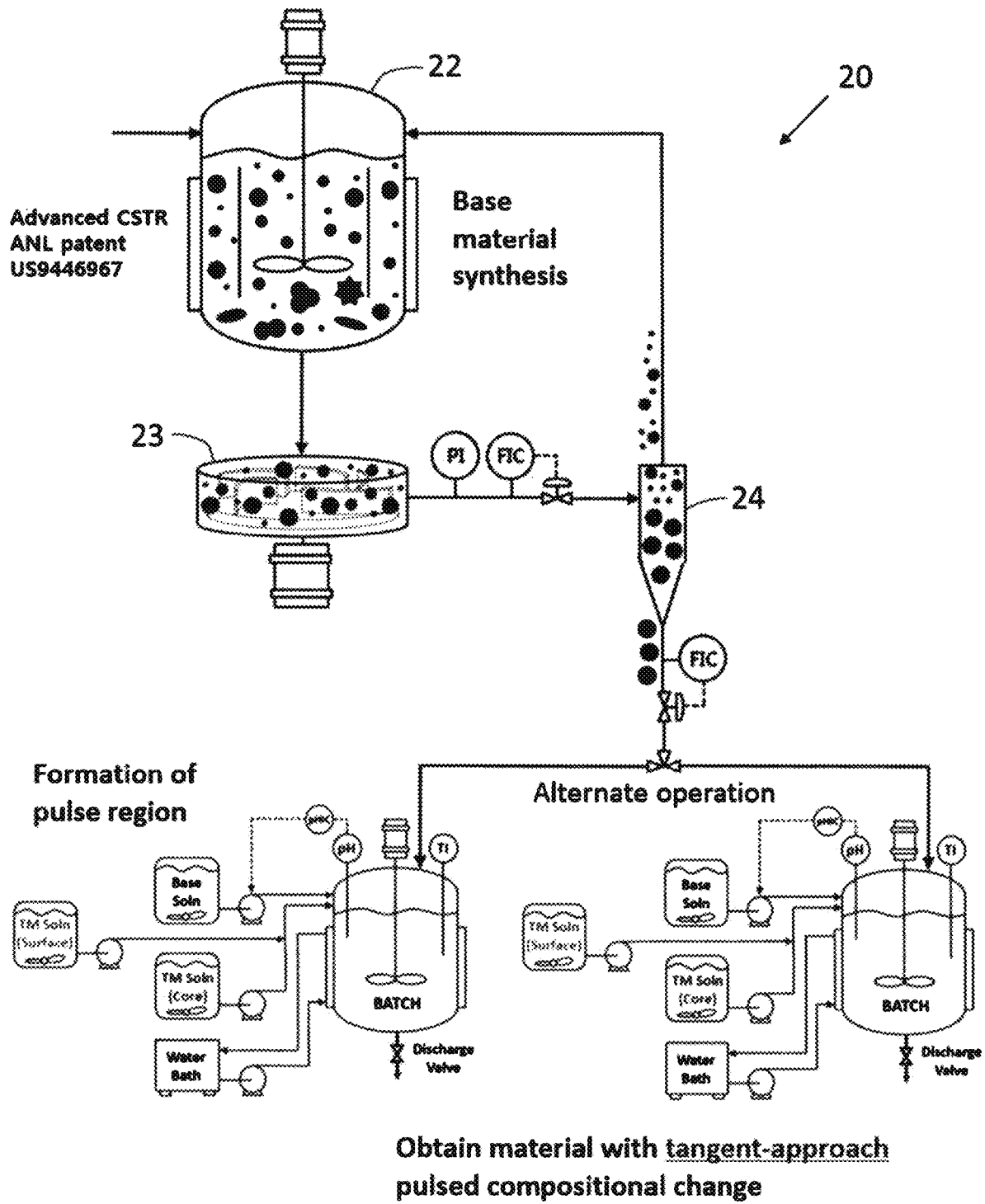
FIG. 17 is a schematic diagram of a semi-continuous synthesis method for creating cathode particles with pulsed compositional changes near the particle surface using a continuous stirred tank reactor with particle size control technology (U.S. Pat. No. 9,446,967) and two batch reactors, in accordance with features of the present invention.

FIG. 17 depicts is an example of a reactor combination for producing a material with tangent-approach pulsed compositional change. First, the same size spherical base material is successively synthesized by an advanced continuous stirred tank reactor (CSTR) system 20 composed of a CSTR 22, a centrifugal disperser 23 and a particle size separator 24.

The synthesized same size base material at the bottom of the particle size separator 24 is then transferred to two batch reactors 26, 28 in turn. In each batch reactor, a pulse phase is formed to produce a material with tangent-approach pulsed compositional change. Detailed reaction conditions to obtain a Ni-rich NMC cathode particle with tangent concentration approach are described in Example 1.

Figure 18:
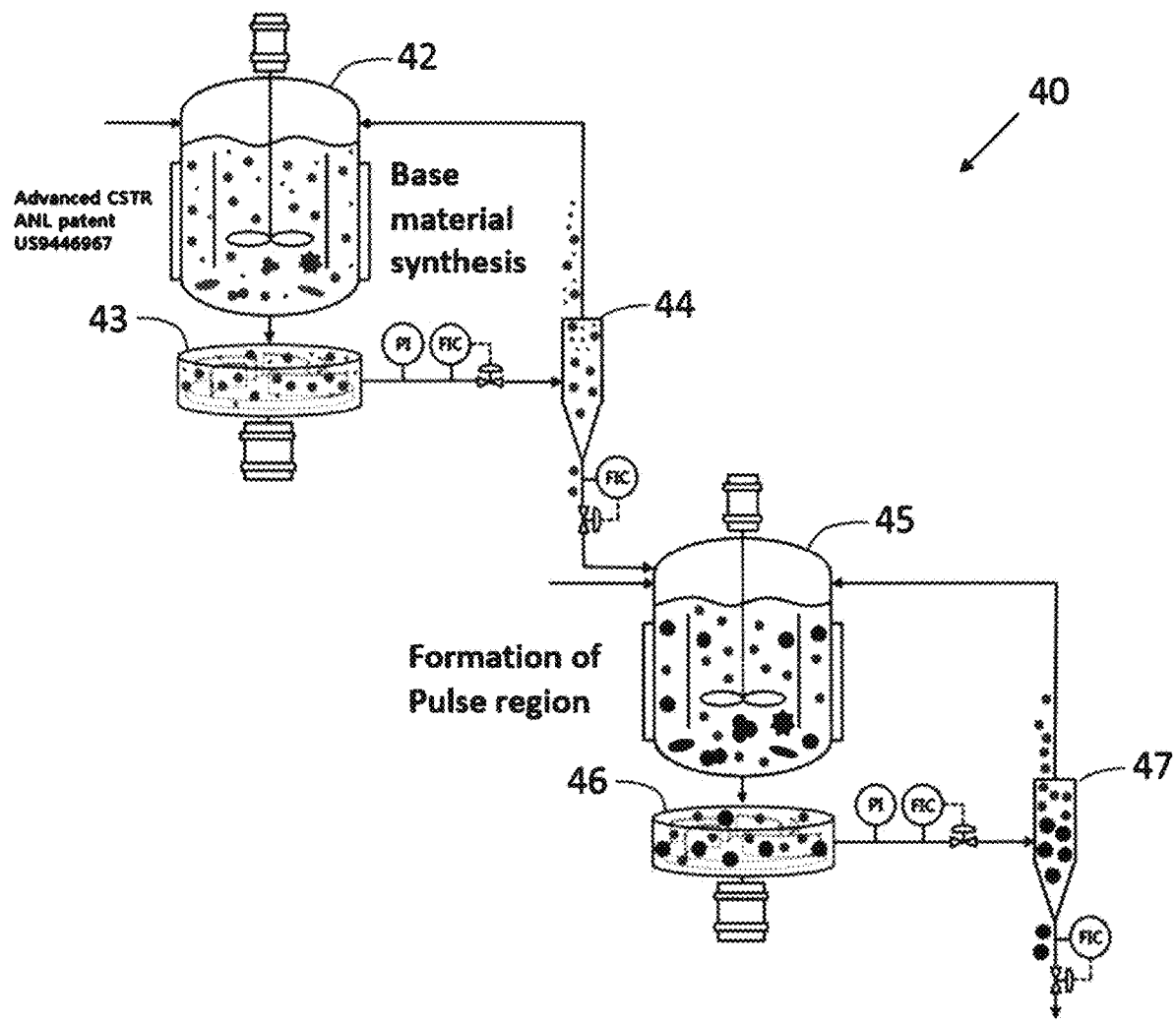
FIG. 18 is a schematic diagram of a continuous synthesis method for creating cathode particles with pulsed compositional changes near the particle surface using two continuous stirred tank reactors with particle size control technology (U.S. Pat. No. 9,446,967), in accordance with features of the present invention.
Figure 19:
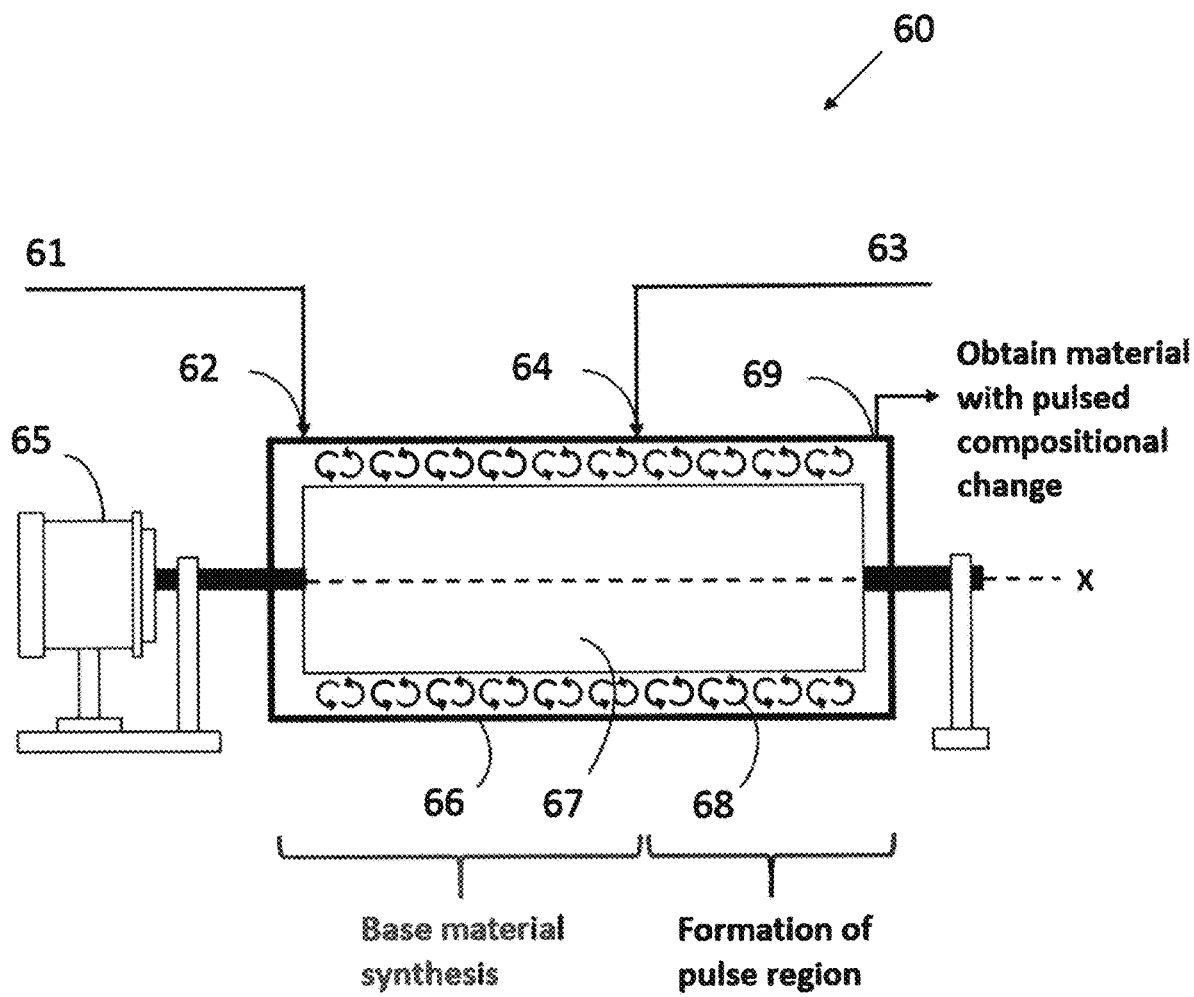
FIG. 19 is a schematic diagram of a continuous synthesis method for creating cathode particles with pulsed compositional changes near the particle surface using a Taylor Vortex Reactor, in accordance with features of the present invention.

FIG. 18 depicts an example of a reactor combination 40 for continuously generating cathode defining a step-approach pulsed compositional change. First, the same size spherical base material is successively synthesized by a first CSTR 22 comprised of a CSTR 4, a centrifugal disperser 43 and a particle size separator 44 and then transferred to a second advanced CSTR 23 comprised of a CSTR 45, a centrifugal disperser 46 and a particle size separator 47. In the second advanced CSTR, a pulse phase is formed to produce a material with step-approach pulsed compositional change. This production method provides improved reproducibility and economic feasibility compared to state of the art batch reactor systems. Detailed reaction conditions to obtain a Ni-rich NMC cathode particle with step concentration approach are described in FIG. 19 is a schematic diagram of a Taylor vortex reactor system 60 that can be used to produce material with pulsed compositional changes near the particle surface. The Taylor vortex reactor system has a cylindrical chamber 66. The chamber is depicted as horizontally disposed but other orientations, vertical or slanted are also suitable. The chamber 66 has a hollow space and a circumferential wall 68 defining the hollow space. A cylindrical stirring shaft 67 is rotatably mounted in the hollow space such that the stirring shaft 67 rotates around axis x by a drive motor 65. The chamber 66 and stirring shaft 67 are co-axially positioned cylinders. A Taylor Vortex flow occurs in the gap between the chamber 66 and stirring shaft 67. The synthesized material is discharged from an outlet port 69 located at one end of the chamber 66.

Several Taylor vortex reactors can be used, or a single Taylor vortex reactor can be used. When a single Taylor vortex reactor is used, more than 50 percent of the reactor is used to form a base phase by injecting core reactants 61 at the upstream reactor inlet 62. Then, pulse reactants 63 is injected into the middle position injection port 64 downstream of the reactor to form a pulsed compositional change layer. (As such, the base reactant material is flowing toward the pulse reactants.) The co-precipitation reaction may proceed under atmospheric pressure. The reaction temperature is selected from between 30° C. and 70° C. Residence time is selected from 1 hour to 10 hours. RPMs are selected from 400 to 1200.

In summary, a cathode active material or its precursor was produced, the material comprising a secondary particle having a uniform composition comprised of a first compound $Li_{a1}Ni_{x1}Co_{y1}Mn_{z1}M_{w1}O_{2+\delta1}$ as the base region. The particle also had at least one pulse region comprising a second compound $Li_{a2}Ni_{x2}Co_{y2}Mn_{z2}M_{w2}O_{2+\delta2}$ overlaying the base phase. In an embodiment of the invention, the second compound completely encapsulates the base region. The composition of the pulsed phase and the composition of the base may overlap partially or spread to each other during the thermal treatment of the precursors with lithium salt due to component movement for crystal formation.

As the composition of the pulse region increases, all the constituents of the base region decrease correspondingly. In both compounds, M is a metal selected from the group consisting of B, C, Na, Mg, Al, Si, Ca, Ti, V, Cr, Fe, Cu, Zn, Ga, Ge, Sr, Zr, Nb, Mo, Ag, Sn, Ba or a combination thereof, and $0.75 \leq a1 \leq 2$, $0 \leq x1 \leq 1$, $0 \leq y1 \leq 1$, $0 \leq z1 \leq 1$, $0 \leq w1 \leq 1$, $0 \leq \delta1 \leq 1$, $0 \leq x1+y1+z1 \leq 1$, and $0 \leq a2 \leq 2$, $0 \leq y2 \leq 1$, $0 \leq z2 \leq 1$, $0 \leq w2 \leq 1$, $0 \leq \delta2 \leq 1$, $0 \leq x2+y2+z2 \leq 1$.

The pulse region of cathode particle surrounds the base region formed by the non-spherical agglomeration of the primary particles, wherein as the composition of the pulse region increases, all the constituents of the base region decrease correspondingly. The concentration of the base region of the cathode material decreases on average in the radial direction as the concentration of the pulse region increases. However, since the cathode material consists of a discrete primary particle rather than a complete sphere, the circumferential concentration of the pulsed layer is smaller or larger than the average concentration reduction amount at the same particle radius. Therefore, the concentration in the circumferential direction at the same particle radius is not the same.

The particle comprised at least one composition of different concentration in radial and circumferential direction, wherein as the composition of the pulse region increases, all the constituents of the base region decrease correspondingly.

The particle is spherical shape and has different particle sizes to show the distribution of large and small particles. Alternatively, the particle is non-spherical, elliptical, oval, convex, concave or clustered shape and has different particle sizes to show the distribution of large and small particles.

The secondary particles have an average particle size of 3 to 30 μm and a particle size distribution of (D90−D10)/D50 of 0.2 to 2. The primary particles have an average particle size less than 500 nm and a particle size distribution of (D90−D10)/D50 of 0.2 to 2.

The thickness or the composition concentration of the pulse region varies with the shape and size of the particles. The pulse phase may comprise a plurality of pulse layers having different composition and thickness combinations.

The lithium concentration in the pulse region is the same as or different from the lithium concentration in the base region. When there is a difference, it increases or decreases in accordance with the concentration of the composition of the pulse region. The pulse region may comprise multiple pulse regions having the same, decreasing, increasing, or a combination of thicknesses from the center toward the surface of the particle.

The pulse region continuously approaches the peripheral base region's first compound from the peak concentration region of the pulse region. This approach may be linear or curvilinear. The pulse region may discretely approach the peripheral base region's first compound or the pulse region-base region interface (where both the first and second compounds exist) from the peak concentration position of the pulse region.

The pulse region has a wider width and a lower concentration of at least one composition through the heat treatment of the precursor.

The cathode active material or its precursor, wherein the primary particles have a concentration gradient with at least one component stronger in the radial direction than the circumferential direction in the pulse region. The primary particles may have an increased or decreased concentration in at least one component in the circumferential or radial direction in the pulse region. The primary particles have a concentration distribution in convex or concave form in at least one component in the pulse region or the base region.

A method for manufacturing a cathode active material is also provided, the method comprising preparing a first aqueous metal-salt solution for forming the base region and a second aqueous metal-salt solution for forming the pulse region of the secondary particle that include nickel, cobalt, and manganese; making base regions of the secondary particles by supplying a chelating agent, an aqueous basic solution and the aqueous metal-salt solution for forming the base region to a reactor; preparing a pulse region in the secondary particle by intermittently supplying or alternately supplying the aqueous metal-salt solution for forming the pulse region during the supply of the aqueous metal-salt solution for forming the base region; drying or thermally treating the co-precipitated secondary particles to manufacture active material precursors; and mixing the active material precursors and lithium salt and thermally treating the mixture to produce a cathode active material. The second aqueous metal-salt solution can be added to reactor intermittently or continuously during the generation of the base region, or continuously added after the base region is generated to create the gradient construct comprised of the co-precipitated particles.

The co-precipitated secondary particle or the cathode active material has a uniform or a concentration gradient composition of at least one component as the base region, at least one composition of different concentration in radial or circumferential direction of a secondary particle or primary particles with or without at least one pulse region and the concentration of all the constituents in the base region decreases correspondingly as the pulse composition increases.

The aqueous metal-salt solution for forming the base region and the aqueous metal-salt solution for forming the pulse region may use one or more different concentrations.

A secondary particle is formed by a combination of at least one concentration holding portion and a concentration gradient portion having at least one different concentration gradient on a straight line between the secondary particle center and the surface excluding pulse region.

In an embodiment of the invented method, a first aqueous metal salt solution will, of course, enter the first reactor. To enable the tangent gradient, a second aqueous metal-salt solution enters the first reactor (a TVR, FIG. 19) together with the first aqueous metal salt solution or enters the second reactor (an advanced CSTR+batch, FIG. 17) together with the first aqueous metal salt solution.

To affect a step approach concentration, only a second aqueous metal-salt solution may enter the second reactor. (Two advanced CSTR, FIG. 18)

Example 1—Manufacture of Ni-Rich NMC
Cathode Particle with Tangent Concentration
Approach as a Pulsed Compositional Change Near
the Particle Surface An advanced CSTR system and a batch reactor were used, supplied with nitrogen gas, maintained at a temperature of 50° C., and stirred at 800 rpm. In order to synthesize the base phase of the secondary particles, a 2M metal aqueous solution for base phase mixed with 90:5:5 molar ratio of nickel sulfate, cobalt sulfate and manganese sulfate was continuously introduced into the CSTR at a flow rate of 0.2 L/hr and a 10 M ammonia aqueous solution was continuously fed into the CSTR at a flow rate of 0.07 L/hr.

When the particle size of the metal hydroxide composite for base secondary particle reached 5 to 6 µm, these materials are transferred to a batch reactor and a 2M aqueous solution for pulse phase mixed with 33:33:33 molar ratio of nickel sulfate, cobalt sulfate and manganese sulfate was continuously introduced into the batch reactor by gradually replacing the 2M metal aqueous solution for the base phase injected into the batch reactor. The resultant metal hydroxide composite having a size of 8 to 10 µm was filtered, washed with water and dried at about 100° C. for 15 hours. The dried metal hydroxide composite was mixed with lithium hydroxide in a molar ratio of 1:1.05, heated at a rate of 2° C./min and then calcined at 850° C. for 10 hours to obtain Ni-rich NMC cathode with tangent concentration approach as a pulsed compositional change near the particle surface of FIGS. 6 and 7.

Example 2—Manufacture of Ni-Rich NMC
Cathode Particle with Step Concentration Approach
as a Pulsed Compositional Change Near the
Particle Surface Two advanced CSTR systems were used, supplied with nitrogen gas, maintained at a temperature of 50° C., and stirred at 800 rpm. In order to synthesize the base phase of the secondary particles, a 2M metal aqueous solution for base phase mixed with 90:5:5 molar ratio of nickel sulfate, cobalt sulfate and manganese sulfate was continuously introduced into the first CSTR at a flow rate of 0.2 L/hr and a 10 M ammonia aqueous solution was continuously fed into the first CSTR at a flow rate of 0.07 L/hr.

When the particle size of the metal hydroxide composite for base secondary particle reached 5 to 6 µm, these materials are transferred to the second CSTR and a 2M aqueous solution for pulse phase mixed with 33:33:33 molar ratio of nickel sulfate, cobalt sulfate and manganese sulfate was continuously introduced into the second CSTR. The resultant metal hydroxide composite having a size of 8 to 10 µm was filtered, washed with water and dried at about 100° C. for 15 hours. The dried metal hydroxide composite was mixed with lithium hydroxide in a molar ratio of 1:1.05, heated at a rate of 2° C./min and then calcined at 850° C. for 10 hours to obtain Ni-rich NMC cathode with step concentration approach as a pulsed compositional change near the particle surface of FIGS. 8 and 9.

Example 3—Manufacture of Ni-Rich NMC
Cathode Particle with Multi-Step Concentration
Approach as a Pulsed Compositional Change Near
the Particle Surface Three advanced CSTR systems were used, supplied with nitrogen gas, maintained at a temperature of 50° C., and stirred at 800 rpm. In order to synthesize the base phase of the secondary particles, a 2M metal aqueous solution for base phase mixed with 90:5:5 molar ratio of nickel sulfate, cobalt sulfate and manganese sulfate was continuously introduced into the first CSTR at a flow rate of 0.2 L/hr and a 10 M ammonia aqueous solution was continuously fed into the first CSTR at a flow rate of 0.07 L/hr. When the particle size of the metal hydroxide composite for base secondary particle reached 5 to 6 µm, these materials are transferred to the second CSTR and a 2M aqueous solution for the first pulse phase mixed with 80:10:10 molar ratio of nickel sulfate, cobalt sulfate and manganese sulfate was continuously introduced into the second CSTR.

When the particle size of the metal hydroxide composite for the secondary particle with first step pulse phase reached 7 to 8 µm, these materials are transferred to the third CSTR and a 2M aqueous solution for the second step pulse phase mixed with 60:20:20 molar ratio of nickel sulfate, cobalt sulfate and manganese sulfate was continuously introduced into the third CSTR. The resultant metal hydroxide composite having a size of 8 to 10 µm was filtered, washed with water and dried at about 100° C. for 15 hours. The dried metal hydroxide composite was mixed with lithium hydroxide in a molar ratio of 1:1.05, heated at a rate of 2° C./min and then calcined at 850° C. for 10 hours to obtain Ni-rich NMC cathode with multi-step concentration approach as a pulsed compositional change near the particle surface of FIGS. 10 and 11.

Example 4—Manufacture of NMR Cathode Particle with Layered-Layered Composition and NMC33/33/33 Composition with Pulsed Compositional Change Near the Particle Surface An advanced CSTR system and a batch reactor were used, supplied with nitrogen gas, maintained at a temperature of 50° C., and stirred at 800 rpm. In order to synthesize the base phase of the secondary particles, a 2M metal aqueous solution for base phase mixed with 33:0:67 molar ratio of nickel sulfate, cobalt sulfate and manganese sulfate was continuously introduced into the CSTR at a flow rate of 0.2 L/hr and a 10 M ammonia aqueous solution was continuously fed into the CSTR at a flow rate of 0.07 L/hr.

When the particle size of the metal hydroxide composite for base secondary particle reached 5 to 6 μm, these materials are transferred to a batch reactor and a 2M aqueous solution for pulse phase mixed with 33:33:33 molar ratio of nickel sulfate, cobalt sulfate and manganese sulfate was continuously introduced into the batch reactor by gradually replacing the 2M metal aqueous solution for the base phase injected into the batch reactor. The resultant metal hydroxide composite having a size of 8 to 10 μm was filtered, washed with water and dried at about 100° C. for 15 hours. The dried metal hydroxide composite was mixed with lithium hydroxide in a molar ratio of 1:1.3, heated at a rate of 2° C./min and then calcined at 850° C. for 10 hours to obtain NMR cathode with layered-layered composition and NMC33/33/33 composition with pulsed compositional change near the particle surface of FIGS. 12 and 13.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The invention claimed is:

1. A cathode active material comprising secondary particles made up of primary particles wherein each of the primary particles exhibit a concentration change in constituents such that the cathode active material has a non-linear change in concentrations of constituents of a first base region and a second pulse region of the cathode active material wherein nickel is one of the constituents of the cathode active material and overall nickel content of the cathode active material is about 80 weight percent or more wherein the base region has the formula $Li_{a1}Ni_{x1}Co_{y1}Mn_{z1}M_{w1}O_{2+\delta 1}$ and M is a metal selected from the group consisting of B, C, Na, Mg, Al, Si, Ca, Ti, V, Cr, Fe, Cu, Zn, Ga, Ge, Sr, Zr, Nb, Mo, Ag, Sn, Ba or a combination thereof, and $0.75 \leq a1 \leq 2$, $0 \leq x1 \leq 1$, $0 \leq y1 \leq 1$, $0 \leq z1 \leq 1$, $0 \leq w1 \leq 1$, $0 \leq \delta 1 \leq 1$, $0 \leq x1+y1+z1 \leq 1$ and the pulse region has the formula $Li_{a2}Ni_{x2}Co_{y2}Mn_{z2}M_{w2}O_{2+\delta 2}$ and M is a metal selected from the group consisting of B, C, Na, Mg, Al, Si, Ca, Ti, V, Cr, Fe, Cu, Zn, Ga, Ge, Sr, Zr, Nb, Mo, Ag, Sn, Ba or a combination thereof, and $0 \leq a2 \leq 2$, $0 \leq x2 \leq 1$, $0 \leq y2 \leq 1$, $0 \leq z2 \leq 1$, $0 \leq w2 \leq 1$, $0 \leq \delta 2 \leq 1$, $0 \leq x2+y2+z2 \leq 1$, wherein each of the primary particles has a primary particle base region and a primary particle pulse region and wherein the concentration of constituents of the primary particle base region changes in a radial and circumferential direction as the composition of the primary particle pulse region increases.

2. The cathode active material as recited in claim 1 wherein the primary particles are between 0.1 μm and 1 μm in diameter.

3. The cathode active material as recited in claim 1 wherein the change in concentrations of constituents of the primary particles_exhibits a shape selected from the group consisting of a sine wave, a square, step, triangle, sawtooth, an exponential curve, and combinations thereof.

4. The cathode active material as recited in claim 1 wherein the base region comprises between 50 and 95 weight percent of the cathode active_material and the pulse region comprises between 5 and 50 weight percent of the cathode active material.

5. The cathode active material as recited in claim 1 wherein the secondary particles each have a center and a surface and the concentration of the constituents of the pulse region increases from the center to the surface while the concentration of the constituents of the base region decreases from the center to the surface.

6. The cathode active material as recited in claim 1 comprising particles having a shape selected from the group consisting of spherical, nonspherical, elliptical, oval, convex, concave, and combinations thereof.

7. The cathode active material as recited in claim 2 wherein the pulse region surrounds the base region formed by an agglomeration of non-spherical primary particles, the concentration of the base region decreases in a radial and circumferential direction as the composition of the pulse region increases, and the composition of the pulse region changes in the circumferential direction at the same particle radius.

8. The cathode active material particle as recited in claim 5 wherein the shape of the secondary particles are spherical, non-spherical, elliptical, elliptical, convex, concave, clustered, or a combination thereof and have different sizes.

9. The cathode active material_as recited in claim 5, wherein the secondary particles have an average particle size of 4 to 20 μm and a particle size distribution of (D90–D10)/D50 of 0.2 to 3.

10. The cathode active material as recited in claim 2 wherein the primary particle has an average particle size less than 1 micron and a particle size distribution of (D90–D10)/D50 of 0.2 to 2.

11. The cathode active material as recited in claim 2 wherein the primary particle has a particle size between 200 nm and 600 nm.

12. The cathode active material as recited in claim 1 wherein a first lithium concentration in the pulse region is equal to or smaller than a second_lithium concentration in the base region.

13. The cathode active material as recited in claim 1 comprising particles each having a center and a surface, wherein each particle includes the second pulse region defining multiple pulse subregions.

14. The cathode active material as recited in claim 13 wherein the pulse subregions have the same, decreasing, increasing, or a combination of thicknesses from the center of the particle toward the surface of the particle.

15. The cathode active material as recited in claim 2 wherein the primary particle defines a shape selected from the group consisting of a leaf, needle, plate, polyhedron, sloped polyhedron, slanted polyhedron, curved polyhedron, ellipse, and combinations thereof.

\* \* \* \* \*